United States Patent
Schmidt et al.

(10) Patent No.: US 10,138,091 B2
(45) Date of Patent: Nov. 27, 2018

(54) VARIABLE LINEAR MOTOR GAP

(71) Applicant: Otis Elevator Company, Farmington, CT (US)

(72) Inventors: Walter Thomas Schmidt, Marlborough, CT (US); Enrico Manes, Feeding Hills, MA (US); Beata I. Wawrzyniak, South Windsor, CT (US); Thomas M. Yun, Glastonbury, CT (US); Shihemn Chen, Northville, MI (US); Jagadeesh Tangudu, South Windsor, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 10 days.

(21) Appl. No.: 15/181,208

(22) Filed: Jun. 13, 2016

(65) Prior Publication Data
US 2017/0355567 A1    Dec. 14, 2017

(51) Int. Cl.
| | |
|---|---|
| *B66B 11/04* | (2006.01) |
| *H02K 41/03* | (2006.01) |
| *H02K 1/12* | (2006.01) |
| *H02K 1/34* | (2006.01) |

(52) U.S. Cl.
CPC ............ *B66B 11/0407* (2013.01); *H02K 1/12* (2013.01); *H02K 1/34* (2013.01); *H02K 41/031* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,231,075 A | * | 6/1917 | Seeberger ........... | B66B 11/0407 187/251 |
| 3,820,472 A | * | 6/1974 | Schwarzler ............ | B60L 13/03 104/284 |
| 5,174,416 A | * | 12/1992 | Sakabe ............... | B66B 11/0407 104/292 |
| 5,195,615 A | * | 3/1993 | Manning ............. | B66B 11/0407 187/251 |

(Continued)

FOREIGN PATENT DOCUMENTS

| | | |
|---|---|---|
| CN | 201419958 Y | 3/2010 |
| EP | 1972593 A1 | 9/2008 |

(Continued)

OTHER PUBLICATIONS

Alipour, Hasan et al., "A PID Sliding Mode Control for Ropeless Elevator Maglev Guiding System", Energy and Power Engineering, 2012, 4, pp. 158-164.

(Continued)

*Primary Examiner* — Michael A Riegelman
(74) *Attorney, Agent, or Firm* — Cantor Colburn LLP

(57) ABSTRACT

The present disclosure relates generally to an elevator system having a hoistway, an elevator car to travel in the hoistway, a first motor portion mounted to one of the elevator car and the hoistway, the first motor portion having at least one coil, a second motor portion mounted to the other of the elevator car and the hoistway, the second motor portion having at least one permanent magnet, and a gap between the first motor portion and the second motor portion.

18 Claims, 5 Drawing Sheets

(56) References Cited

U.S. PATENT DOCUMENTS

| | | | | |
|---|---|---|---|---|
| 5,235,145 A | * | 8/1993 | Olsen | H02K 41/025 187/250 |
| 5,276,293 A | * | 1/1994 | Narumi | H02K 41/025 187/250 |
| 5,749,444 A | | 5/1998 | Skalski | |
| 5,751,076 A | * | 5/1998 | Zhou | B66B 11/0407 187/250 |
| 6,189,657 B1 | * | 2/2001 | Jessenberger | B66B 11/0407 187/289 |
| 6,305,501 B1 | * | 10/2001 | Kahkipuro | B66B 11/0407 187/250 |
| 6,513,627 B1 | * | 2/2003 | Cruise | B66B 15/08 187/258 |
| 7,478,706 B2 | | 1/2009 | Kocher et al. | |
| 9,457,988 B1 | * | 10/2016 | Anderson | B66B 5/16 |
| 2003/0106746 A1 | * | 6/2003 | Grundmann | H02K 15/03 187/289 |
| 2005/0087400 A1 | * | 4/2005 | Zhou | B66B 11/0407 187/277 |
| 2012/0193172 A1 | * | 8/2012 | Matscheko | B60L 7/00 187/289 |
| 2015/0191329 A1 | * | 7/2015 | Moon | B66B 9/00 187/254 |
| 2016/0083225 A1 | * | 3/2016 | Piech | B66B 11/0407 187/250 |
| 2016/0083226 A1 | | 3/2016 | Piech et al. | |
| 2016/0297647 A1 | * | 10/2016 | Tangudu | B66B 11/0407 |

FOREIGN PATENT DOCUMENTS

| | | |
|---|---|---|
| JP | H06135660 A | 5/1994 |
| JP | H10139310 A | 5/1998 |
| JP | H10139311 A | 5/1998 |
| KR | 970009386 B1 | 6/1997 |
| WO | 2014209309 A1 | 12/2014 |

OTHER PUBLICATIONS

Gurbuz, Cagri et al., "Linear motor for multi-car elevators: design and position measurement", Turk J Elec Eng & Comp Sci, vol. 19, No. 6, 2011, 12 pages.

* cited by examiner

VARIABLE LINEAR MOTOR GAP

TECHNICAL FIELD OF THE DISCLOSED EMBODIMENTS

The present disclosure is generally related to linear motors and, more particularly, to a linear motor for an elevator system.

BACKGROUND OF THE DISCLOSED EMBODIMENTS

Some machines, such as elevator systems, include a propulsion system having one or more linear motors to propel, for example, an elevator car in a hoistway. The linear motor may include a stationary or primary motor portion having coils or windings and a moving or secondary motor portion having one or more permanent magnet. Electrical current is provided to the primary motor portion to permit movement of the secondary motor portion within a hoistway. The primary and secondary motor portions are separated by a gap having a width sufficient to prevent contact between the two motor portions. However, the primary motor portion may experience significant thermal loads during operation, especially during peak usage such as morning and afternoon commute times in an elevator system. Thermal loads are significantly higher at locations having higher duty cycles and lower speeds, such as a lobby level or top floor in an elevator system.

Therefore, a need exists for an elevator system to reduce thermal loading on the linear motor and increase efficiency of the linear motor while maintaining a sufficiently wide gap to prevent contact between the first motor portion and the second motor portion during operation.

SUMMARY OF THE DISCLOSED EMBODIMENTS

In an embodiment of the present disclosure, an elevator system is provided having a hoistway, an elevator car to travel in the hoistway, a first motor portion mounted to one of the elevator car and the hoistway, the first motor portion having at least one coil, a second motor portion mounted to the other of the elevator car and the hoistway, the second motor portion having at least one permanent magnet, and a gap between the first motor portion and the second motor portion. The gap includes a first gap distance at a first hoistway location and a second gap distance at a second hoistway location. The second gap distance is greater than the first gap distance.

The first motor portion may be mounted to the hoistway. The first motor portion may have a first width at the first hoistway location and a second width at the second hoistway location, the first width being greater than the second width. The first motor portion may have a third width at a third hoistway location, the third width being greater than the second width and less than the first width. The third hoistway location may be located between the first hoistway location and the second hoistway location. The first hoistway location may be a bottom portion of the hoistway. The first hoistway location may be a top portion of the hoistway. The second hoistway location may be a central portion of the hoistway. The second motor portion may include a first permanent magnet portion disposed adjacent a first side of the first motor portion and a second permanent magnet portion disposed adjacent a second side of the first motor portion. The gap may include a first gap adjacent the first side of the first motor portion and a second gap adjacent the second side of the first motor portion. The first gap may have a first gap distance substantially equal to a second gap distance of the second gap.

In an embodiment of the present disclosure, a propulsion system is provided having a moving motor portion configured to be fixed to an object to be moved, and a stationary motor portion configured to be fixed to a stationary structure. The moving motor portion and the stationary motor portion are configured to coact to control the movement of the moving motor portion relative to the stationary motor portion. The stationary motor portion is configured to be spaced from the moving motor portion a first gap distance at a first stationary structure location and spaced from the moving motor portion a second gap distance at a second stationary structure location.

One of the moving motor portion and the stationary motor portion may include at least one permanent magnet and the other of the moving motor portion and the stationary motor portion may include at least one coil. The stationary motor portion may have a first width at the first stationary structure location and a second width at the second stationary structure location, the first width being greater than the second width. The stationary motor portion may have a third width at a third stationary structure location, the third width being greater than the second width and less than the first width. The third stationary structure location may be located between the first stationary structure location and the second stationary structure location. The first stationary structure location may be a stationary structure lower portion. The first stationary structure location may be a stationary structure upper portion. The second stationary structure location may be a stationary structure central portion. The moving motor portion may include a first permanent magnet portion disposed adjacent a first side of the stationary motor portion and a second permanent magnet portion disposed adjacent a second side of the stationary motor portion. The first permanent magnet portion may be spaced from the first side by a first gap distance and the second permanent magnet portion may be spaced from the second side by a second gap distance, the first gap distance being substantially equal to the second gap distance.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
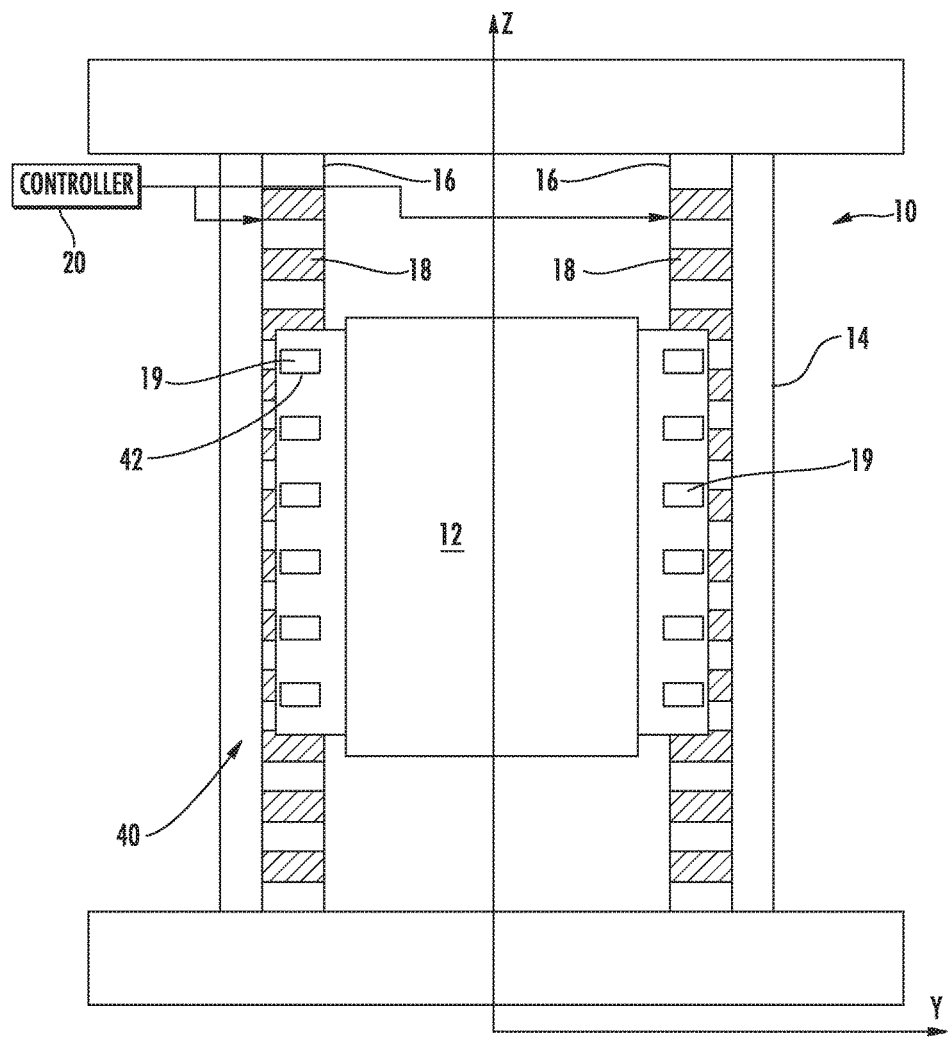
FIG. 1 is a schematic side view of a propulsion system having a linear motor.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 depicts a propulsion system for an exemplary elevator system 10 having an elevator car 12. While an elevator system is depicted, it should be understood that the present disclosure may be applied to any linear motor system. In the exemplary elevator system, the elevator car 12 or object to be moved travels in a hoistway 14 or other stationary structure. The elevator car 12 is guided by one or more guide rails 16 extending along the length of hoistway 14 or other stationary structure. Exemplary elevator system 10 employs a permanent magnet synchronous linear motor 40 having a first motor portion 18 and a second motor portion 42. The first motor portion 18 is a stator or stationary motor portion having one or more coils or phase windings. The first motor portion 18 may be mounted to guide rail 16, incorporated into the guide rail 16, or may be located apart from guide rail 16. The first motor portion 18 serves as one portion of the permanent magnet synchronous linear motor 40 to impart motion to the elevator car 12 or object to be moved. Permanent magnets 19 are mounted the car 12 or object to be moved to provide the second motor portion 42 or moving motor portion of the permanent magnet synchronous linear motor 40. Coils or windings of the first motor portion 18 may be arranged in three phases, as is known in the electric motor art. Two first motor portions 18 may be positioned in the hoistway 14 to coact with the permanent magnets 19 of the second motor portion 42 mounted to the elevator car 12 or object to be moved. The permanent magnets 19 may be positioned on two sides of the elevator car 12 or object to be moved, as shown in FIG. 1. In an embodiment, the first motor portion 18 is mounted to the elevator car 12 or object to be moved, and the second motor portion 42 is mounted to the hoistway 14 or other stationary structure. Alternate embodiments may use a single first motor portion 18/second motor portion 42 configuration, or multiple first motor portion 18/second motor portion 42 configurations, or any other known type of linear motor.

In an embodiment, the controller 20 provides drive signals to the first motor portion 18 to control motion of the elevator car 12. The controller 20 may be implemented using a general-purpose microprocessor executing a computer program stored on a storage medium to perform the operations described herein. Alternatively, controller 20 may be implemented in hardware, such as an application-specific integrated circuit (ASIC) or a field-programmable gate array (FPGA) in two non-limiting examples, or in a combination of hardware/software. Controller 20 may also be part of an elevator control system. Controller 20 may include power circuitry, including such non-limiting examples as an inverter or drive, to power the first motor portion 18.

Figure 2:
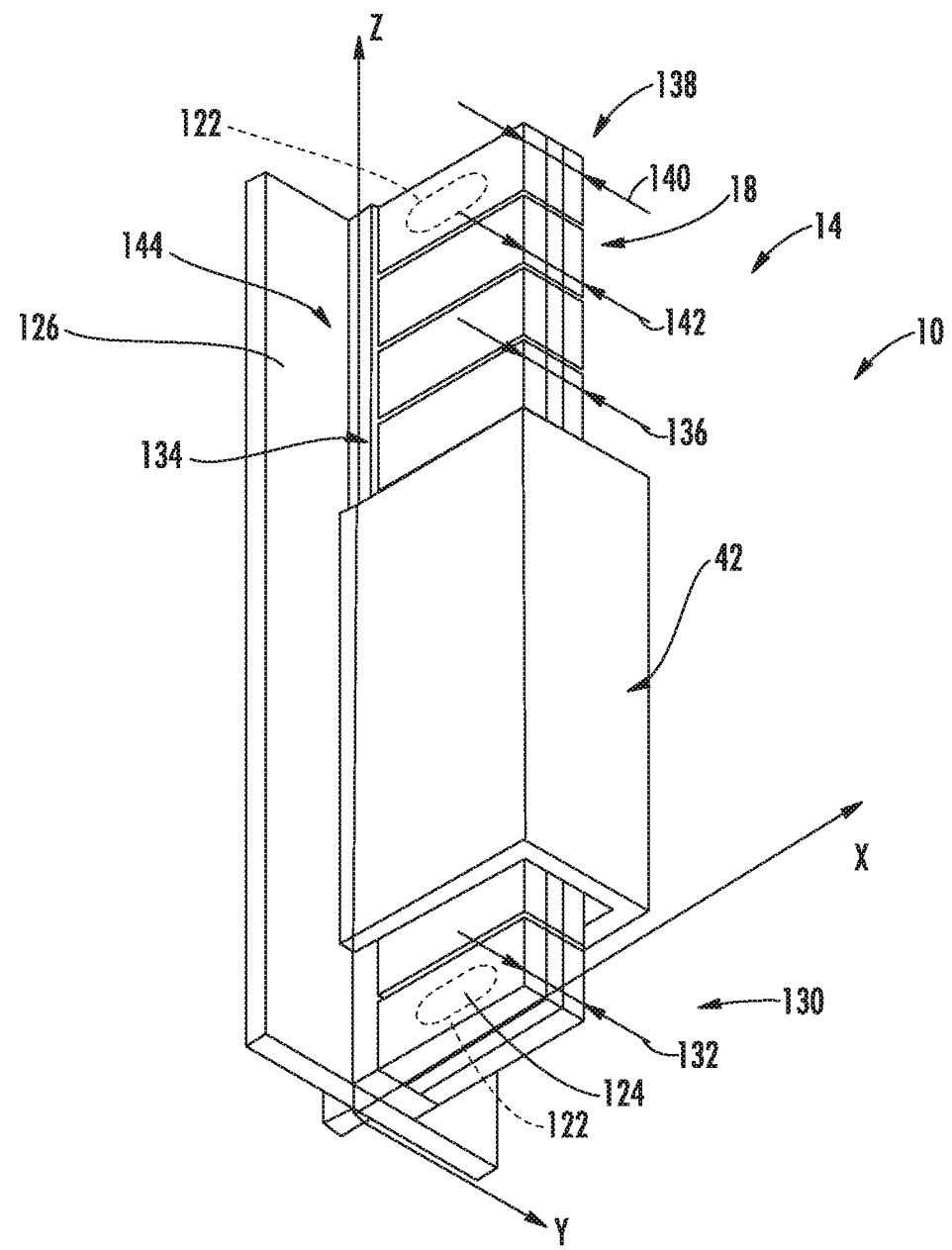
FIG. 2 is a perspective view of a propulsion system having a linear motor according to an embodiment of the present disclosure.

FIG. 2 is a perspective view of the first motor portion 18 and the second motor portion 42 of the exemplary elevator system 10 of FIG. 1 according to one embodiment. The first motor portion 18 is a stator that includes one or more coils or windings 122 formed about a stator core 124. Although two coils 122, each aligned vertically, are illustrated adjacent each other in each vertical row in FIG. 2, the first motor portion 18 may include only one vertically-aligned coil 122 for each vertical row and may include more than two coils 122 aligned vertically in each vertical row. Further, additional embodiments include the first motor portion 18 having coils 122 aligned horizontally such that each horizontally-aligned coil 122 forms a vertical row of the first motor portion 18. Coils 122 may be arranged in a plurality of phases including, without limitation, three phases. Coils 122 may be formed using electrical conductors such as copper or aluminum wires or tape in one or more non-limiting examples. Using aluminum for coils 122, such as wires or tape in one or more non-limiting examples, reduces the mass of the first motor portion 18 and reduces the cost of installation. First motor portion 18 is mounted to a stationary support 126, which may be a metal member secured to an inner wall of the hoistway 14. Stationary support 126 may also serve as the guide rail 16.

In accordance with an embodiment, coils 122 of the first motor portion 18 have a predetermined width such that a width of the first motor portion 18 is variable based on the vertical location of the coil 122 in the hoistway 14, as indicated by the location along the Z-axis in FIG. 2. At a lower portion 130 of the hoistway 14, the first motor portion 18 may have a first width 132. At a central portion 134 of the hoistway 14, the first motor portion 18 may have a second width 136. At an upper portion 138 of the hoistway 14, the first motor portion 18 may have a third width 140.

The first width 132 is greater than the second width 136 in an embodiment such that the first motor portion 18 has a smaller width at a central portion of the hoistway 14, as will be explained in more detail below. The third width 140 may be equal to the first width 132 or the second width 136. Adjacent coils 122 may not increase significantly in width and may gradually increase or decrease in width to allow gradual transition between coils 122. As one example, at a location 144 between the upper portion 138 and the central portion 134, the first motor portion 18 may have a fourth width 142 that is greater than the second width 136, but less than the third width 140.

Figure 3:
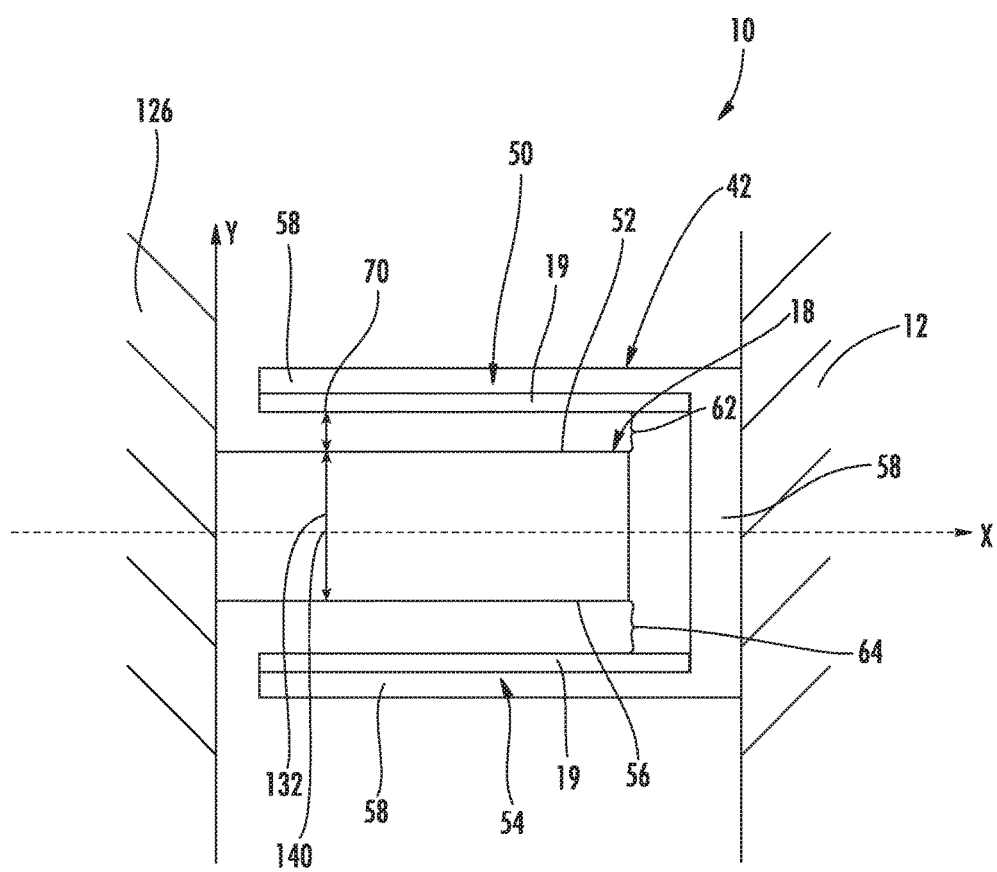
FIG. 3 is a cross-sectional view of a propulsion system having a linear motor according to an embodiment of the present disclosure.
Figure 4:
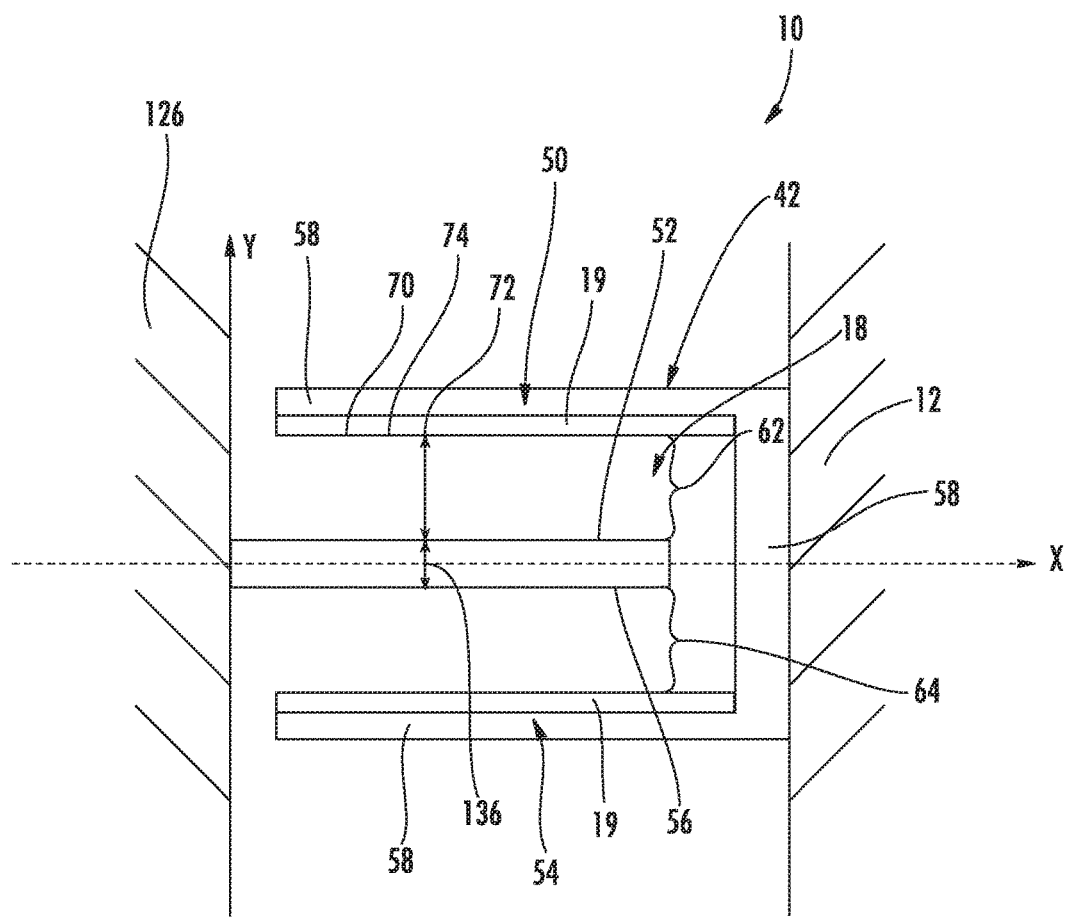
FIG. 4 is a cross-sectional view of a propulsion system having a linear motor according to an embodiment of the present disclosure.
Figure 5:
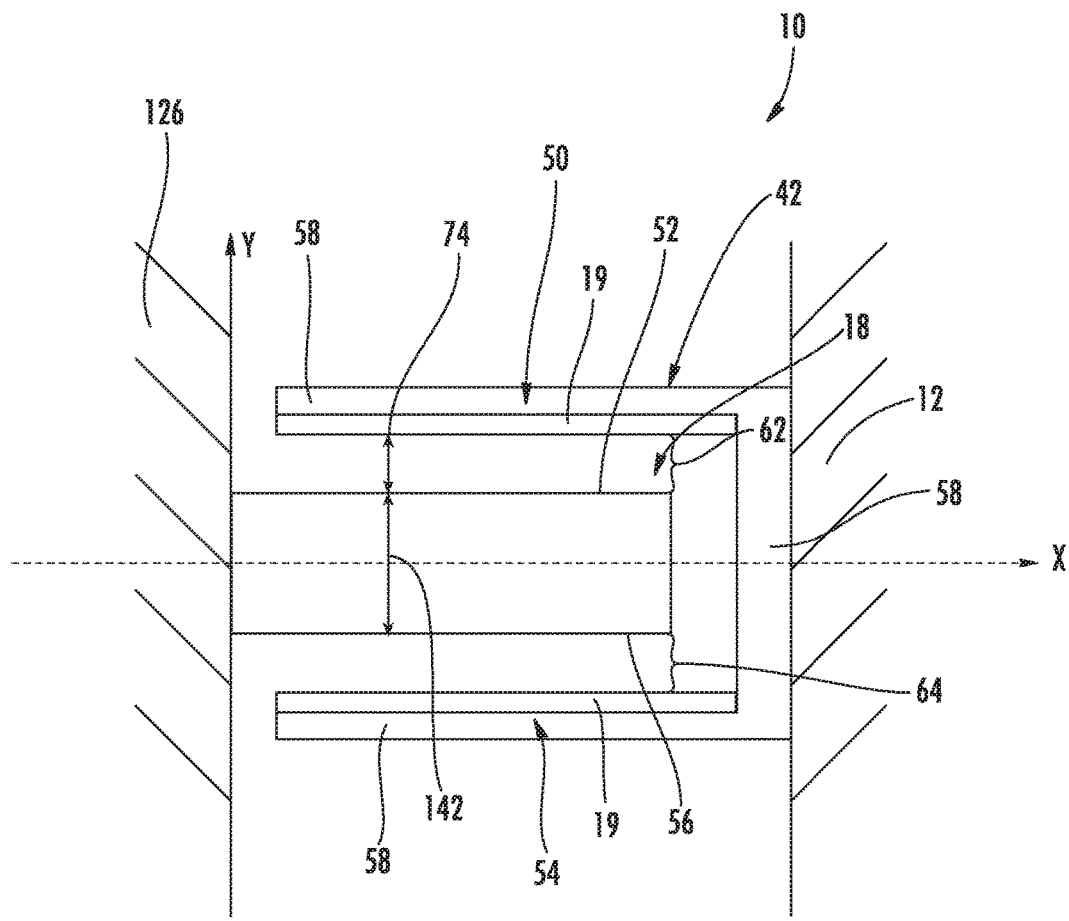
FIG. 5 is sectional view of a propulsion system having a linear motor according to an embodiment of the present disclosure.

As will be explained in further detail below, at locations such as a lobby or other floor at the lower portion 130 of the hoistway 14 or a top floor at the upper portion 138 of the hoistway 14, a high level of traffic volume and low travel speeds significantly increases the thermal load on an elevator system as compared to other locations, such as express zones at the central portion 134 of the hoistway 14. Therefore, at the lower portion 130 and the upper portion 138 of the hoistway 14, the width of a gap 62 between the first motor portion 18 and the second motor portion 42, illustrated in FIGS. 3-5, is relatively small compared to the width of the gap 62 at the central portion 134 to minimize the thermal load at those high traffic/low travel speed locations. In contrast, the gap 62 is maintained as a sufficiently large clearance to prevent contact at the high speed/low traffic locations, such as the central portion 134. In an embodiment, the width of the gap 62 is smaller at some or all landings, as compared to a high speed/low traffic location, such as the central portion 134. In a further embodiment, a lobby or other high traffic location may have the narrowest gap 62, an express zone or other high speed location may have the widest gap 62, and the gaps 62 at one or more intermediate landings or other locations may have one or more widths between the widths of the gaps 62 at the high traffic and high speed locations.

Referring now to FIGS. 3-5, cross sectional views of the first motor portion 18 and the second motor portion 42 are shown. As illustrated in FIGS. 2-5, the second motor portion 42 includes the permanent magnets 19 positioned at least partially around the first motor portion 18. A first permanent magnet portion 50 is positioned adjacent to a first side 52 of the first motor portion 18. A second permanent magnet portion 54 is positioned adjacent to a second, typically opposite, side 56 of the first motor portion 18. One or more permanent magnet supports 58 are mounted to the elevator car 12 in the embodiment illustrated in FIGS. 3-5. Permanent magnet support 58 may be made from a ferromagnetic material, such as steel in one non-limiting example. To reduce the weight, permanent magnet support 58 may be made of aluminum or another material that is lighter than steel.

Permanent magnet support 58 includes the permanent magnets 19 mounted on the interior surfaces of the first permanent magnet portion 50 and the second permanent magnet portion 54. In additional embodiments, the permanent magnets 19 are embedded in the one or more permanent magnet supports 58. Permanent magnets 19 are positioned to be parallel with the first side 52 and the second side 56 of the first motor portion 18.

At least one gap 62 is formed between the first motor portion 18 and the second motor portion 42. Specifically, a first side gap 62 is defined between the first permanent magnet portion 50 and the first side 52 and a second side gap 64 is defined between the second permanent magnet portion 54 and the second side 56 in the embodiments of FIG. 3-5. In the illustrated embodiment, the first side gap 62 has a distance substantially equal to a distance of the second side gap 64 for each hoistway location. However, in other embodiments, the first side gap 62 has a distance not equal to a distance of the second side gap 64 for one or more hoistway locations. Any reference to gap 62 herein may further describe gap 64 as well in an embodiment, such as those embodiments where the first side gap 62 is substantially equal to the second side gap 64.

Referring specifically to FIG. 3, the gap 62 includes a first gap distance 70. The first gap distance 70 may relate to the first width 132 of the first motor portion 18 illustrated in FIG. 2 as increasing a width of the first motor portion 18 results in decreasing a distance of the gap 62 in an embodiment. The first gap distance 70 corresponds to a first hoistway location or stationary structure location, including but not limited to the lower portion 130 and/or the upper portion 138 of the hoistway 14 in the illustrated embodiment. The gap 62 of the embodiment illustrated in FIG. 4 includes a second gap distance 72 corresponding to the second width 136 of the first motor portion 18 illustrated in FIG. 2. The second gap distance 72 corresponds to a second hoistway location or stationary structure location, including but not limited to the central portion 134 of the hoistway 14 in the illustrated embodiment. The second gap distance 72 is greater than the first gap distance 70.

In the embodiment illustrated in FIG. 5, the gap 62 includes a third gap distance 74 corresponding to the fourth width 142 of the first motor portion 18 illustrated in FIG. 2. The third gap distance 74 is greater than the first gap distance 70, but less than the second gap distance 72. The third gap distance 74 corresponds to a third hoistway location or stationary structure location, including but not limited to the location 144 between the upper portion 138 and the central portion 134 of the hoistway 14 in the illustrated embodiment.

In one non-limiting example, the first gap distance 70 is between 1.5 and 2 millimeters and the second gap distance 72 is between 3 and 4 millimeters. In one embodiment, the first gap distance 70 may be less than 1.5 or greater than 2 millimeters. In one embodiment, the second gap distance 72 may be less than 3 or greater than 4 millimeters. The third gap distance 74 in the non-limiting example is between 2 and 3 millimeters. In one embodiment, the third gap distance 74 may be less than 2 or greater than 3 millimeters. While the precise gap distances 70, 72, 74 may vary as properly determined by one of ordinary skill in the art, the gap distances 70, 72, 74 are not equal.

The elevator system 10 described herein provides the linear motor 40 with a first, primary motor portion 18 extending vertically in the hoistway 14. The first motor portion 18 has variable widths, such as widths 132, 136, 140, 142, across its vertical length. The variable widths provide for a variation in width of one or more gaps 62 between the first motor portion 18 and the secondary or second motor portion 42.

The gap 62 prevents contact between the first motor portion 18 and the second motor portion 42 due to vibrations of the car 12 as it ascends or descends in the hoistway 14. However, increasing the width of the gap 62 increases the required amount of current provided to the first motor portion 18 to generate thrust, thereby increasing the thermal load on the first motor portion 18. At locations such as a lobby or other floor at the lower portion 130 of the hoistway 14 or a top floor at the upper portion 138 of the hoistway 14, the high level of traffic volume and low travel speeds significantly increase the thermal load as compared to other locations, such as express zones at the central portion 134 of the hoistway 14. Therefore, at the lower portion 130 and the upper portion 138 of the hoistway 14, the width of the gap 62 is relatively small compared to the width of the gap 62 at the central portion 134 to minimize the thermal load at those high traffic/low travel speed locations. In another embodiment, at either the lower portion 130 or the upper portion 138 of the hoistway 14, the width of the gap 62 is relatively small compared to the width of the gap 62 at the central portion 134 to minimize the thermal load at that high traffic/low travel speed location. Lower duty cycles and reduced thermal loading at the central portion 134 allow a wider gap 62 at the central portion 134 to prevent any safety or operational concerns.

The gap 62 of the present embodiments improves the efficiency of the linear motor 40 and reduces the thermal loading on the linear motor 40 while maintaining a large enough clearance to prevent contact between the first motor portion 18 and the second motor portion 42. Especially during times of peak usage, such as morning and afternoon commute times, the gap 62 will improve thermal management of the linear motor 40. However, the propulsion system utilizing the linear motor 40 disclosed herein is not limited to use with or in an elevator system and may be utilized for horizontal and/or vertical propulsion in other machinery or vehicle systems.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:
1. An elevator system comprising:
a hoistway;
an elevator car to travel in the hoistway;
a first motor portion mounted to one of the elevator car and the hoistway, the first motor portion having a first coil and a second coil, the first coil at a first hoistway location, the second coil at a second hoistway location;

a second motor portion mounted to the other of the elevator car and the hoistway, the second motor portion having at least one permanent magnet; and a gap between the first motor portion and the second motor portion, wherein the gap includes a first gap distance at the first hoistway location and a second gap distance at the second hoistway location, the second gap distance being greater than the first gap distance.

2. The elevator system of claim 1, wherein the first motor portion is mounted to the hoistway.

3. The elevator system of claim 2, wherein the first motor portion has a first width at the first hoistway location and a second width at the second hoistway location, the first width being greater than the second width.

4. The elevator system of claim 3, wherein the first motor portion has a third width at a third hoistway location, the third width being greater than the second width and less than the first width.

5. The elevator system of claim 4, wherein the third hoistway location is located between the first hoistway location and the second hoistway location.

6. The elevator system of claim 1, wherein the first hoistway location is a bottom portion of the hoistway.

7. The elevator system of claim 1, wherein the first hoistway location is a top portion of the hoistway.

8. The elevator system of claim 1, wherein the second hoistway location is a central portion of the hoistway.

9. The elevator system of claim 1, wherein the second motor portion includes a first permanent magnet portion disposed adjacent a first side of the first motor portion and a second permanent magnet portion disposed adjacent a second side of the first motor portion.

10. The elevator system of claim 9, wherein the gap includes a first gap adjacent the first side of the first motor portion and a second gap adjacent the second side of the first motor portion, the first gap having a first gap distance substantially equal to a second gap distance of the second gap.

11. A propulsion system comprising:

a moving motor portion configured to be fixed to an object to be moved; and a stationary motor portion configured to be fixed to a stationary structure, wherein the moving motor portion and the stationary motor portion are configured to coact to control the movement of the moving motor portion relative to the stationary motor portion;

wherein the stationary motor portion is configured to be spaced from the moving motor portion a first gap distance at a first stationary structure location and spaced from the moving motor portion a second gap distance at a second stationary structure location, wherein the stationary motor portion has a first width at the first stationary structure location and a second width at the second stationary structure location, the first width being greater than the second width, and wherein the stationary motor portion has a third width at a third stationary structure location, the third width being greater than the second width and less than the first width.

12. The propulsion system of claim 11, wherein one of the moving motor portion and the stationary motor portion comprises at least one permanent magnet and the other of the moving motor portion and the stationary motor portion comprises at least one coil.

13. The propulsion system of claim 11, wherein the third stationary structure location is located between the first stationary structure location and the second stationary structure location.

14. The propulsion system of claim 11, wherein the first stationary structure location is a stationary structure lower portion.

15. The propulsion system of claim 11, wherein the first stationary structure location is a stationary structure upper portion.

16. The propulsion system of claim 11, wherein the second stationary structure location is a stationary structure central portion.

17. The propulsion system of claim 11, wherein the moving motor portion includes a first permanent magnet portion disposed adjacent a first side of the stationary motor portion and a second permanent magnet portion disposed adjacent a second side of the stationary motor portion.

18. The propulsion system of claim 17, wherein the first permanent magnet portion is spaced from the first side by a first gap distance and the second permanent magnet portion is spaced from the second side by a second gap distance, the first gap distance being substantially equal to the second gap distance.

* * * * *